United States Patent
Carroll et al.

[15] 3,670,438
[45] June 20, 1972

[54] AUTO TRAVEL TROUBLE SIGN

[72] Inventors: John Robert Carroll, 332 Arlington; John Michael Kiniry, 107 Maple Drive, both of Satellite Beach; Anthony Finazzo, 108 Snead Road, Indian Harbour Beach, all of Fla. 32935

[22] Filed: June 29, 1970

[21] Appl. No.: 50,680

[52] U.S. Cl. .........................................................40/129 C
[51] Int. Cl. ..............................................................G09f 7/00
[58] Field of Search.................40/2, 136, 135, 129 C, 142 A, 40/125 F, 134

[56] References Cited

UNITED STATES PATENTS

| | | | |
|---|---|---|---|
| 1,446,241 | 2/1923 | Armstrong | 40/134 |
| 2,588,183 | 3/1952 | Vigon | 40/134 |

FOREIGN PATENTS OR APPLICATIONS

| | | | |
|---|---|---|---|
| 612,988 | 1/1961 | Canada | 40/134 |
| 66,440 | 3/1948 | Denmark | 40/134 |
| 760,224 | 12/1933 | France | 40/134 |

Primary Examiner—Robert W. Michell
Assistant Examiner—Wenceslao J. Contreras
Attorney—John Cyril Malloy

[57] ABSTRACT

Sign means including a plastic sign plate emboss formed of thin sheet plastic and having raised luminescent lettering forming a word for communicating a message of distress or information. The sign means includes a permanent magnet strip fixed to the backside of the sign plate for temporary attachment thereof to the exterior surface of a wrecked or stalled automobile on a highway or thoroughfare.

1 Claim, 4 Drawing Figures

PATENTED JUN 20 1972
3,670,438
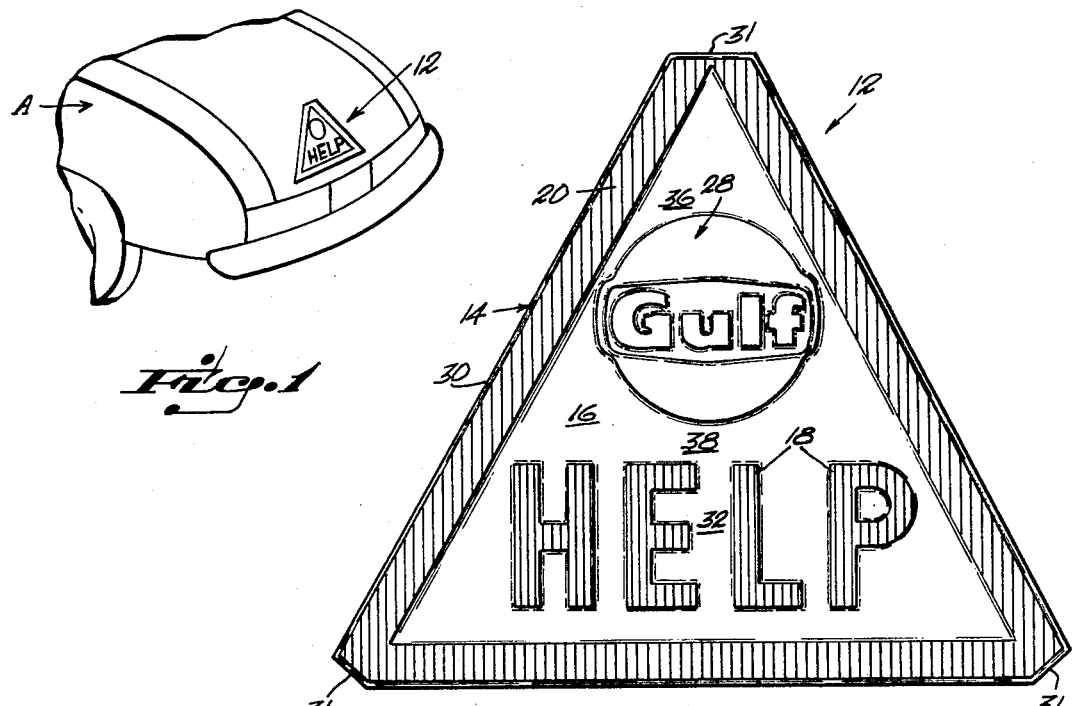
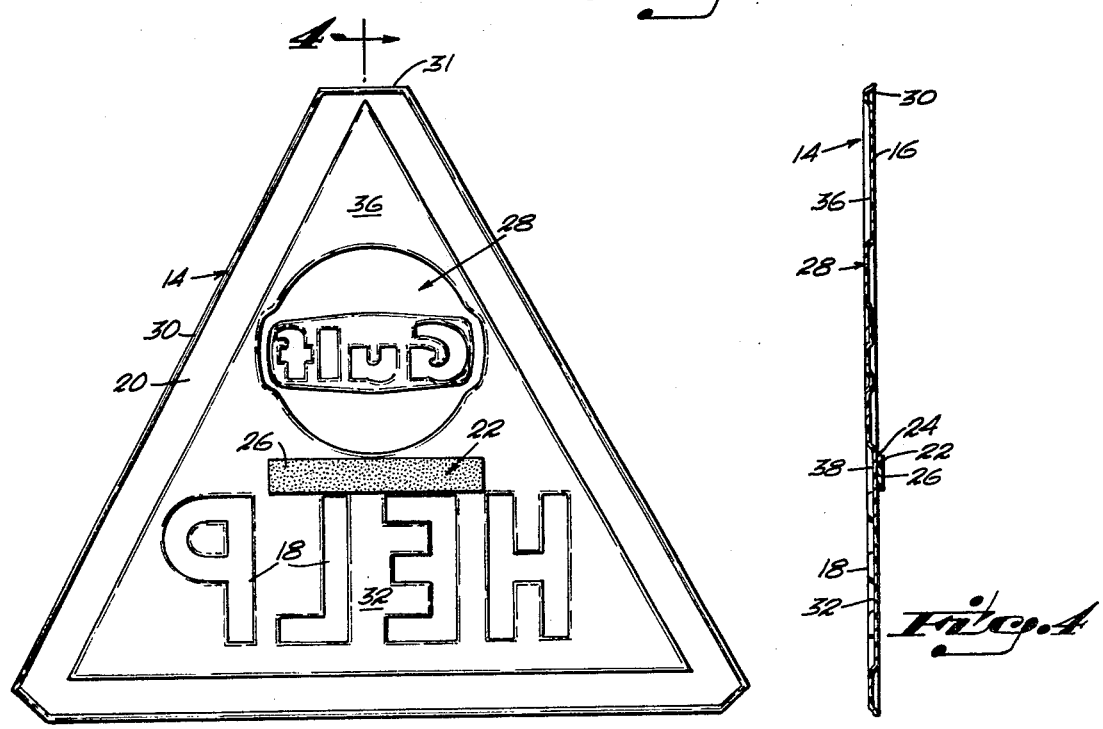
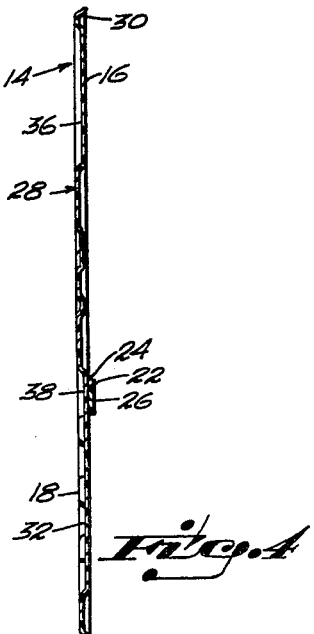
INVENTOR.
JOHN ROBERT CARROLL
JOHN MICHAEL KINIRY
BY ANTHONY FINAZZO
John Cyril Malloy
ATTORNEY.

AUTO TRAVEL TROUBLE SIGN

DESCRIPTION OF THE PRIOR ART

Various sign devices have heretofore been designed for use by a motorist in a stalled vehicle for warning or apprising passing motorists of an unsafe highway condition or in seeking assistance in the repair of a stalled vehicle. Certain problems are noted in the construction and use of these prior art devices: They may be of awkward design and fabrication causing problems in storage or conveyance in an automobile when not in use; the prior art sign means may be of complex configuration and be difficult to use and to attach to or remove from the automobile.

SUMMARY OF THE INVENTION

The instant invention is substantially of mechanically simple design and construction. It is easy to use; it may be quickly and easily attached to or removed from the exterior surface of an automobile by magnetic attachment means. It is versatile in use and may be applied to substantially any automobile body; it may be readily applied to substantially any location on the body and in a prominent location readily visible to passing motorists. The sign means is easy to store or package and may be magnetically attached to the interior of the automobile trunk or the engine compartment of the automobile when not in use; it may be conveniently carried in the automobile. If desired, it may be formed with advertising indicia for sales promotion or advertising a particular product or service. The sign means is of substantially durable construction and of simple design facilitating economical manufacture and marketing or distribution as a give-away item.

BRIEF DESCRIPTION OF THE DRAWING

FIG. 1 is an environmental view of the sign means of the instant invention, showing it attached to the rear section of an automobile;

FIG. 2 is a front face view of the sign means;

FIG. 3 is a rear face view thereof; and

FIG. 4 is a vertical plane sectional view taken as on the line 4—4 of FIG. 3.

DESCRIPTION OF THE PREFERRED EMBODIMENT

The sign means of the instant invention is indicated by numeral 12 and is shown and described in conjunction with an automobile A (partially shown in FIG. 1). The sign means 12 includes an equilateral triangular sign plate 14, a recognized distress signal, formed of thin sheet plastic material of semi-rigid character. The sign plate 14 is press formed or emboss formed and defines a generally planar background area 16, a series of letter areas 18 protruding forwardly of the background 16, and a border area 20 bounding the triangular background area 16 and in relief, protruding uniformly forwardly of the background area.

The means for removably attaching the sign plate to the automobile A includes a permanent magnet 22 fixedly secured centrally to the back surface of the sign plate 14; adhesive means 24 are provided for the magnet interposed between mating surfaces to secure the strip-form magnet 22 on the back surface of the sign plate. The sign means 12 is magnetically secured to a desired location on the automobile by engaging the outer exposed surface 26 of the magnet strip 22 with the exterior metal surface of the automobile.

The series of letter areas 18 or the embossed lettering formed in the thin sheet plastic sign plate structure may compose any word or phrase for communicating an intelligible message, as for example, the letters may be H-E-L-P, as shown in the drawings. The forward face surfaces of the series of letter areas 18 and the forward face surface of the triangular border area 20, which preferably are embossed, are coated with bright luminescent substance of high light reflecting property. The letter areas 18 and border areas 20 preferably are coated with fluorescent material for high contrast and vividness in day or night use of the sign device.

Advertising or indicia means 28 may also be formed on the sign plate 14 for a trademark display advertising the product or services of a commercial or industrial enterprise. The advertising means 28 may be emboss formed forwardly of the planar background 16 of the sign plate 14, and if desired may be painted or otherwise coated with color for contrast and vividness.

In a preferred embodiment, the sign is molded and is of substantially rigid, yet somewhat pliable plastic material of a thickness, which is thin for signs of such material, that is of between one-thirty-seconds and one-sixteenths inch, and with the over-all area being of a height of at least about 8 to 10 inches and the base being of about 10 to 12 inches. Preferably, the material of the sign is polypropylene of the class which does not substantially soften except about 120° F. In this preferred embodiment, the apex areas, such as at 31, are blunted to avoid breakage of the same. Also, the outer edges are slightly flared along the return side of the embossed boundary zone of the preferred embodiment, as indicated at 30, to reinforce the edge and to define a rounded outer edge to resist cracks, or stress risers. The sheet form sign of the preferred size is rigidified by means of the embossed letters, defining a rigidfying pattern in the relatively large message bearing base zone area 32 of the sign, that is the area just above base line 34. Above this reinforced base zone area 32, there remains a relatively small triangular display area 36 which may be employed by the supplier of the distress sign to display the trademark, preferably to be embossed thereupon, such as the Gulf trademark, which also serves to rigidify this area in the preferred embodiment. The central zone 38 intermediate the base area 32 and display area 36 provides the area 38 for the attachment of the magnet means which is secured thereto as set forth above, that is in the flat unreinforced intermediate zone between the reinforced upper lower display and base areas and between the embossed rigidified boundary areas. It is thus seen that a light weight inexpensive disposable distress sign as provided which by reasons of the dimensions and reinforcing described and set forth herein is adapted for use in a give-away program by oil companies and which serves the purpose of providing a needed distress sign for motorists for use as required along busy expressways where there are long distances between exits and available help.

We claim:

1. Sign means adapted for temporary detachable mounting at an arbitrarily chosen location upon the exterior surface of an automobile stalled on a thoroughfare, said sign means being shaped triangularly for communicating a message of distress to motorists travelling the thoroughfare, said sign means comprising a single sign plate member having front and back sides, said sign plate being emboss formed of thin sheet plastic material of uniform thickness and color and having a generally planar background area, and a plurality of alphabetical letter areas each emboss formed and protruding forwardly of said background area, with the letter areas being arranged in a series forming a word for communicating an intelligible distress message and with each letter area having a coating of bright colored luminescent substance formed on its protruding surface, and including means for temporarily detachably mounting the sign plate to the automobile exterior at such locations thereon as is prominently visible to motorists travelling the thoroughfare including a permanent magnet mass and means fixedly securing said magnet mass to the back surface of said sign plate; said sign plate being of a conventional distress signal shape constituting a substantially equilateral triangular shape; said sign plate being emboss formed peripherally and provided with a border area providing rigidifying means uniformly protruding forwardly of said planar background area a distance substantially the same as the protrusion of the letter area and with the protruding surface of said border area defining said distress shape and having a coating of bright colored luminescent substance the same as that of the letter; said permanent magnet mass being in the form of a single strip of magnet material arranged generally centrally of said sign plate; adhesive means and said strip of magnet material being adhesively secured to the back surface of said sign plate; said sign means being about 8 to 10 inches in height; said alphabetical letter areas extending upwardly from the base of said sign to about midway of the height of the display sign providing rigidifying means for the sign and the sign plate is embossed along the margins thereof providing a border area protruding out of the main plane of the sign and the return edge of the border area to the brink edge of the sign is flared to merge and blend with the main plane of the sign plate.

* * * * *